L. N. WISEWELL.
Garden Sprinkler.
No. 211,075. Patented Dec. 17, 1878.
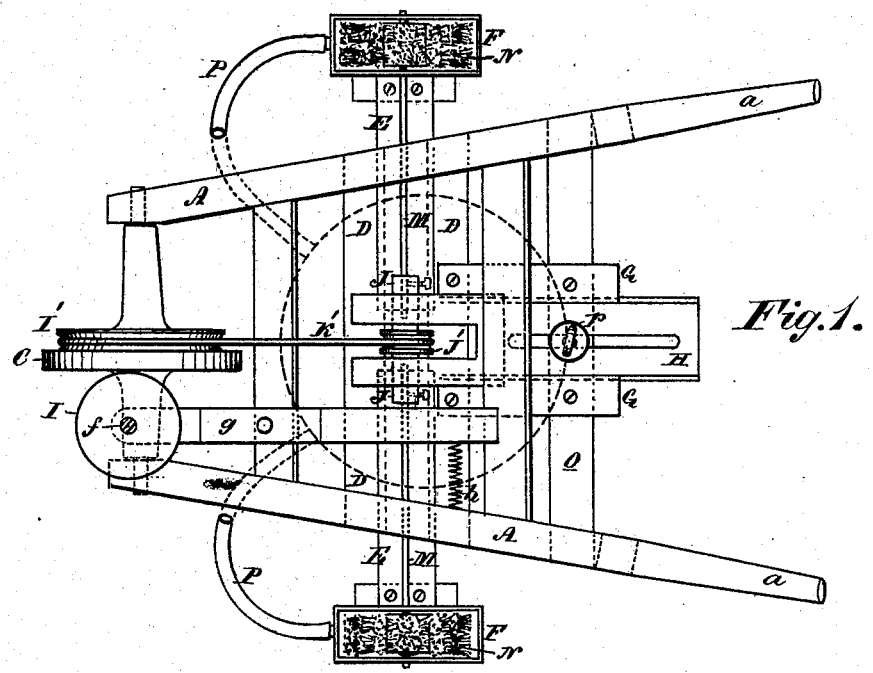
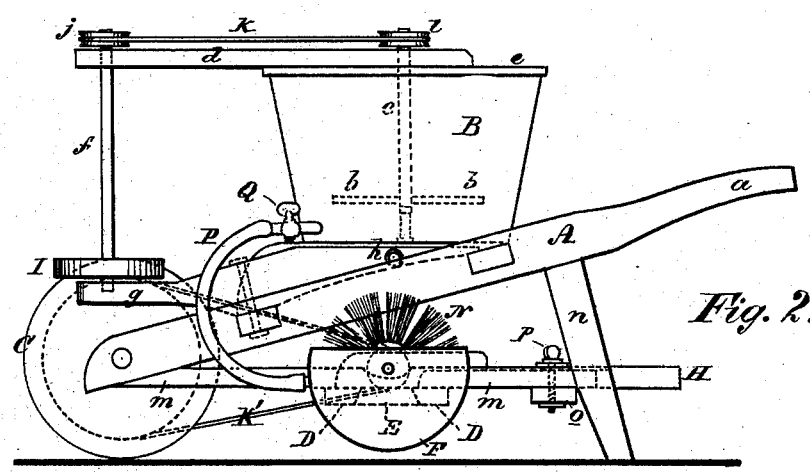

UNITED STATES PATENT OFFICE.

LUCIUS N. WISEWELL, OF OTTAWA, ONTARIO, CANADA, ASSIGNOR OF ONE-HALF HIS RIGHT TO JOSEPH F. HANRAHAN, OF SAME PLACE.

IMPROVEMENT IN GARDEN-SPRINKLERS.

Specification forming part of Letters Patent No. 211,075, dated December 17, 1878; application filed November 25, 1878.

*To all whom it may concern:*

Be it known that I, LUCIUS NOYES WISEWELL, of the city of Ottawa, in the county of Carleton, in the Province of Ontario, in the Dominion of Canada, have invented certain new and useful Improvements in Garden-Sprinklers; and I do hereby declare that the following is a full, clear, and exact description of the same.

The object of this invention is to construct a device to be wheeled, principally intended for use in the application of paris-green mixed with water, or other poisonous liquids, for sprinkling potato-vines to destroy the potato-bug; and it consists of a wheelbarrow-frame carrying a reservoir to contain the poisonous liquid, which is fed through flexible tubes to rotary brushes on the ends of a shaft terminating at both sides of the wheelbarrow-frame, which, on an extension-frame, is provided with open-top cups, in which the brushes rotate. The shaft is divided at the center and keyed in a rotary sleeve driven by an endless band from the carrying-wheel of the barrow. A stirring device within the reservoir, driven by the carrying-wheel, agitates the liquid contents. By the adjustment of the divided shaft the brushes are extended apart to suit the width of the rows, and by the propulsion of the barrow they sprinkle the liquid forwardly and upwardly.

Figure 1 is a top view, and Fig. 2 a side view, of my machine.

A is the wheelbarrow-frame, and B a reservoir secured thereon to contain the paris-green or other poisonous solution, which is kept in agitation by arms $b$ on a vertical shaft, $c$, stepped in the bottom of the reservoir, and journaled in a bar, $d$, attached to a fixed portion of the cover $e$, the other portion being hinged thereto, to allow of the insertion of the water and paris-green. In the opposite end of the bar $d$ is journaled a loose hanging shaft, $f$, which is stepped in a lever, $g$, fulcrumed to the barrow-frame, the opposite end being provided with a spiral or other spring, $h$, whereby the wheel I on the shaft $f$ is kept in frictional contact with the side of the carrying-wheel C, for driving the stirring-shaft $c$ by means of the pulley $j$ on the end of shaft $f$, endless band K, and pulley $l$ on the end of stirring-shaft $c$, by the propulsion of the frame by the handles $a$ in wheeling.

$m$ are bars secured to the legs $n$ and front of barrow, and D are bars secured to said bars $m$ transversely below the reservoir B, said bars D supporting longitudinally therewith sliding bars E E, the inner ends approaching and the outer ends carrying open-mouthed cups F F, which, by the adjustment of the sliding bars E E, may be extended to any desired distance apart.

$o$ is a bar secured transversely to the bars $m$, and G G are bevel-edged guide-bars secured to bar $o$ and bar D, and between said bars G G, in line with the draft, slides a bevel-edged bar, H, having on its inner end a suitable boxing, in which rotates, by peripheral contact, a cylindrical sleeve, J, having centrally a pulley, J', which is driven by an endless band, K', from a band-wheel, I', secured to the side of the carrying-wheel C on its shaft. The bar $o$ is provided with a longitudinal slot and thumb-screw, $p$, to fasten it at the required tension of the band K'.

M is a shaft divided at the middle and connected by the sleeve J, in which the ends are extensibly fastened. The outer ends of the shaft carry brushes N N, which rotate in the cups F F, through which the shaft is journaled, and is driven through the intervention of the pulley-sleeve J, band K', and wheel I' from the carrying-wheel C. By the sliding movement of the shaft M, the bars E E, cups F F, and brushes N N are combinedly moved to suit the distance between the rows of vines.

P are flexible tubes, connecting the reservoir B with the cups F F, to conduct the liquid to the brushes, the supply being regulated by valves Q, suitably located. The barrow is wheeled between the rows of vines, and the brushes sprinkle the poisonous solution upwardly and outwardly, thus distributing it to the under side of the leaves and clear of the operator. The bars E E slide automatically with the sliding movement of the shaft M by the brushes being fast on the shaft, and the cups fast on the bars E E, and the brushes within the cups.

I claim as my invention—

1. The rotary brushes N N, combined with a divided shaft, M, adjustable longitudinally, for the purpose set forth.

2. The cups F F and rotary brushes N N, combined with a wheeled frame, A, having shaft M, to operate as set forth.

3. The combination of the wheeled frame A, handles $a$, reservoir B, tubes P, cups F F, sliding bars E E, shaft M, and brushes N N, pulley-sleeve J, and band K' with a driving and carrying wheel, C, substantially as and for the purpose set forth.

4. The combination, with a wheeled frame, A, carrying a reservoir, B, of a shaft, $c$, having stirring-arms $b$, with said reservoir, and rotary brushes N N, with cups F F, whereby the solid and liquid contents of the reservoir are agitated and distributed, in the manner as set forth.

L. N. WISEWELL.

Witnesses:
JOHN GRIST,
T. J. ROSS.